United States Patent [19]
Suhara

[11] Patent Number: 6,006,250
[45] Date of Patent: Dec. 21, 1999

[54] DATA PROCESSING SYSTEM AND PROGRAMMING METHOD THEREFOR

[75] Inventor: Naoki Suhara, Tokyo, Japan

[73] Assignee: Aiwa Co., Ltd., Tokyo, Japan

[21] Appl. No.: 08/843,191

[22] Filed: Apr. 14, 1997

[30] Foreign Application Priority Data

Apr. 25, 1996 [JP] Japan .................................. 8-105241

[51] Int. Cl.⁶ .............................. G05B 15/00; G06F 1/00
[52] U.S. Cl. ......................... 709/202; 709/230; 709/208
[58] Field of Search ............................... 706/800.34, 16, 706/10, 41; 364/185.01, 229, 229.2, 230, 230.2; 707/103; 709/208, 4, 202, 5, 230, 6; 710/110; 712/34

[56] References Cited

U.S. PATENT DOCUMENTS

| | | | |
|---|---|---|---|
| 4,598,356 | 7/1986 | Dean ........................................ | 714/48 |
| 4,703,420 | 10/1987 | Irwin ....................................... | 710/113 |
| 4,833,596 | 5/1989 | Buckland et al. ......................... | 710/14 |
| 5,029,073 | 7/1991 | Takaya et al. ............................ | 712/34 |
| 5,109,333 | 4/1992 | Kubota .................................... | 712/34 |
| 5,121,502 | 6/1992 | Rau et al. ................................ | 712/24 |
| 5,561,769 | 10/1996 | Kumar .................................... | 709/202 |
| 5,642,482 | 6/1997 | Pardillos ................................. | 709/230 |
| 5,740,325 | 4/1998 | Wang ...................................... | 706/16 |
| 5,748,468 | 5/1998 | Notenboom ............................. | 364/132 |
| 5,802,145 | 9/1998 | Farris et al. .............................. | 379/34 |

FOREIGN PATENT DOCUMENTS

| | | |
|---|---|---|
| 0 378 415 A2 | 7/1990 | European Pat. Off. . |
| 0 682 309 A2 | 11/1995 | European Pat. Off. . |

OTHER PUBLICATIONS

Henk Corporaal, et al., "Move: A Framework for High–Performance Processor Design" Proceedings of the Supercomputing Conference, Albuquerque, Nov. 18–22, 1991, pp. 692–701.

*Primary Examiner*—Ahmad F. Matar
*Assistant Examiner*—Khanh Quang Dinh

[57] ABSTRACT

A data processing system improved in respect to the processing speed and a method of describing programs for the system. The data processing system includes a plurality of devices capable of processing data and interconnection managing units connected to one another and provided at least in one-to one correspondence in association with the devices. The interconnection managing unit is so designed as to allow processing to be executed on the associated device in accordance with an input program while transferring the program to the other interconnection managing unit(s). Further, the data processing system includes a program managing unit which is connected to all the interconnection managing units for managing execution of program in the individual interconnection managing units.

5 Claims, 6 Drawing Sheets

FIG.6 PRIOR ART

DATA PROCESSING SYSTEM AND PROGRAMMING METHOD THEREFOR

BACKGROUND OF THE INVENTION

1. Field of the Invention

The present invention relates to a data processing system including a plurality of devices, in which data processings are performed in the devices in accordance with a program or programs.

2. Description of the Related Art

Figure 6:
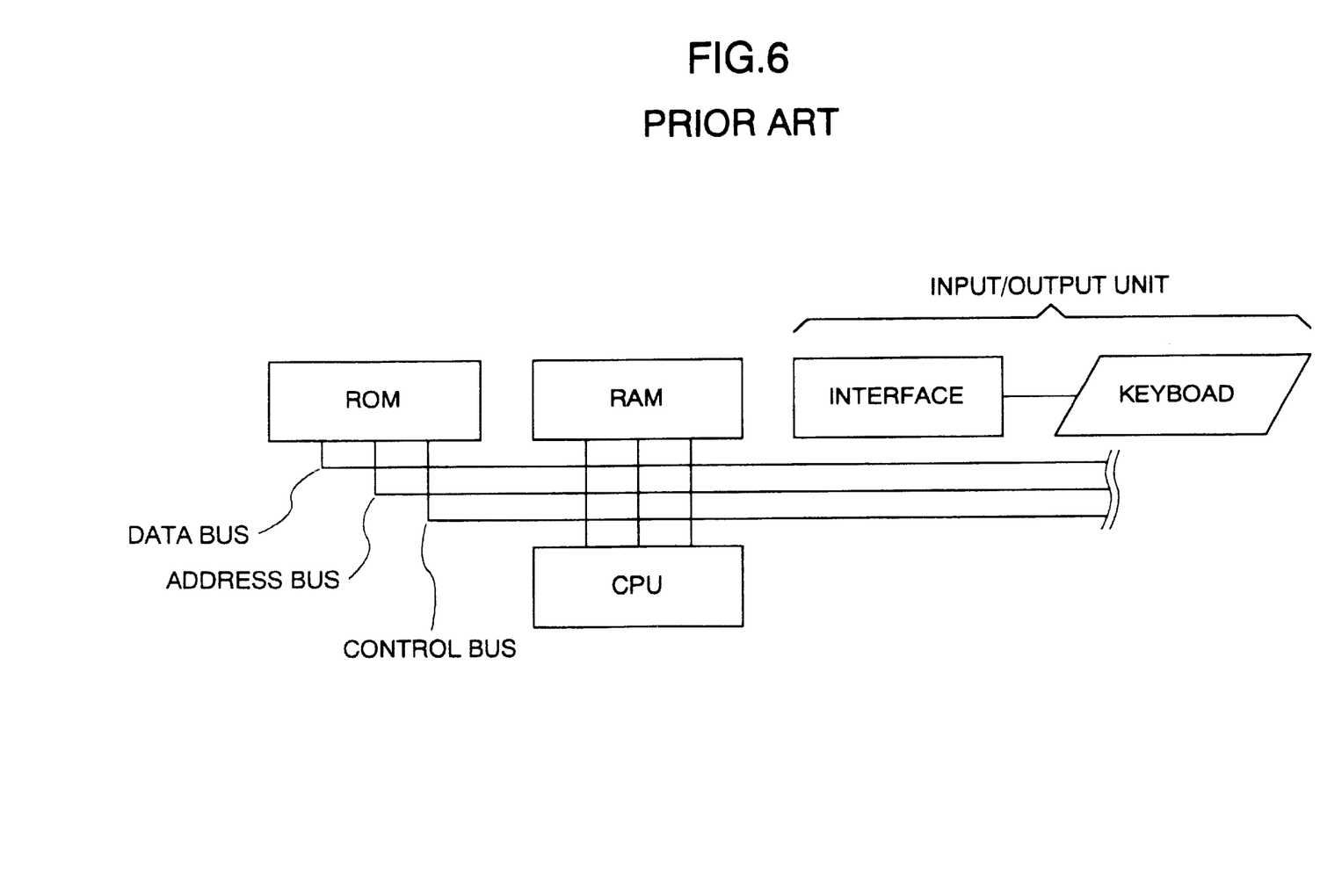
FIG. 6 is a block diagram showing schematically a conventional arithmetic processing circuit.

For having better understanding of the concept underlying the present invention, description will first be made of a conventional data processing system known heretofore. FIG. 6 of the accompanying drawings is a schematic diagram for illustrating, by way of example, data processing executed by a conventional data processing system by taking as example the addition of "3" a given augend. In that case, instructions mentioned below are executed as the arithmetic processings involved in the addition of "3".

0000 LOAD H, 3 . . . place "3" in an H-register of a CPU of the data processing system.

0001 LOAD 0100, H . . . transfer the data placed in the H-register to a memory at an address "100" thereof.

0002 IN L, 0200 . . . transfer augend data to an L-register of the CPU from an input/output unit having an address "200".

0003 ADD H, L . . . add together the data stored in both the H-register and the L-register, whereon a sum data resulting from the addition is placed in the H-register.

0004 LOAD 0101, H . . . transfer the sum data of the H-register to the memory at the address "101" thereof.

0005 OUT 0200, H . . . transfer the data of the H-register incorporated in the CPU to the input/output unit having the address "200".

As can be seen from the above elucidation, in any processing step, the data necessarily undergoes the processing executed by the CPU (Central Processing Unit), which in turn means that the processing speed of the data processing system depends on the processing speed or capability of the CPU incorporated in the data processing system. To say in another way, the processing speed of a data processing system is inevitably determined by the processing capability or speed of the CPU, thus giving rise to a problem.

SUMMARY OF THE INVENTION

In the light of the state of the art briefed above, it is an object of the present invention to solve the problems of the conventional data processing system and provide to this end a data processing system which is capable of performing data processing at a high speed independent of the processing speed or capability of the CPU.

In view of the above and other objects which will become apparent as the description proceeds, there is provided according to an aspect of the present invention a data processing system which includes a plurality of devices for processing data, a plurality of interconnection managing units interconnected to one another and each provided at least in one-to-one correspondence in association with each of the devices for allowing the associated devices to execute processings in accordance with a program as inputted and sending the program to the other interconnected interconnection managing units, and a program managing unit connected to all of the interconnection managing units for managing execution of the program in each of the interconnection managing units.

According to another aspect of the invention, there is provided in conjunction with the data processing system described above, a method of describing a program, which method includes the step of describing the aforementioned program so that it contains at least data to be processed, routing information indicating an order in which the program is transferred among the aforementioned interconnection managing units and condition-related information indicating transfer conditions allowing the program to be transferred among the interconnection managing units.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as a preferred or typical embodiment thereof by reference to the drawings. In the following description, like reference characters designate like or corresponding parts throughout the several views.

Figure 1:
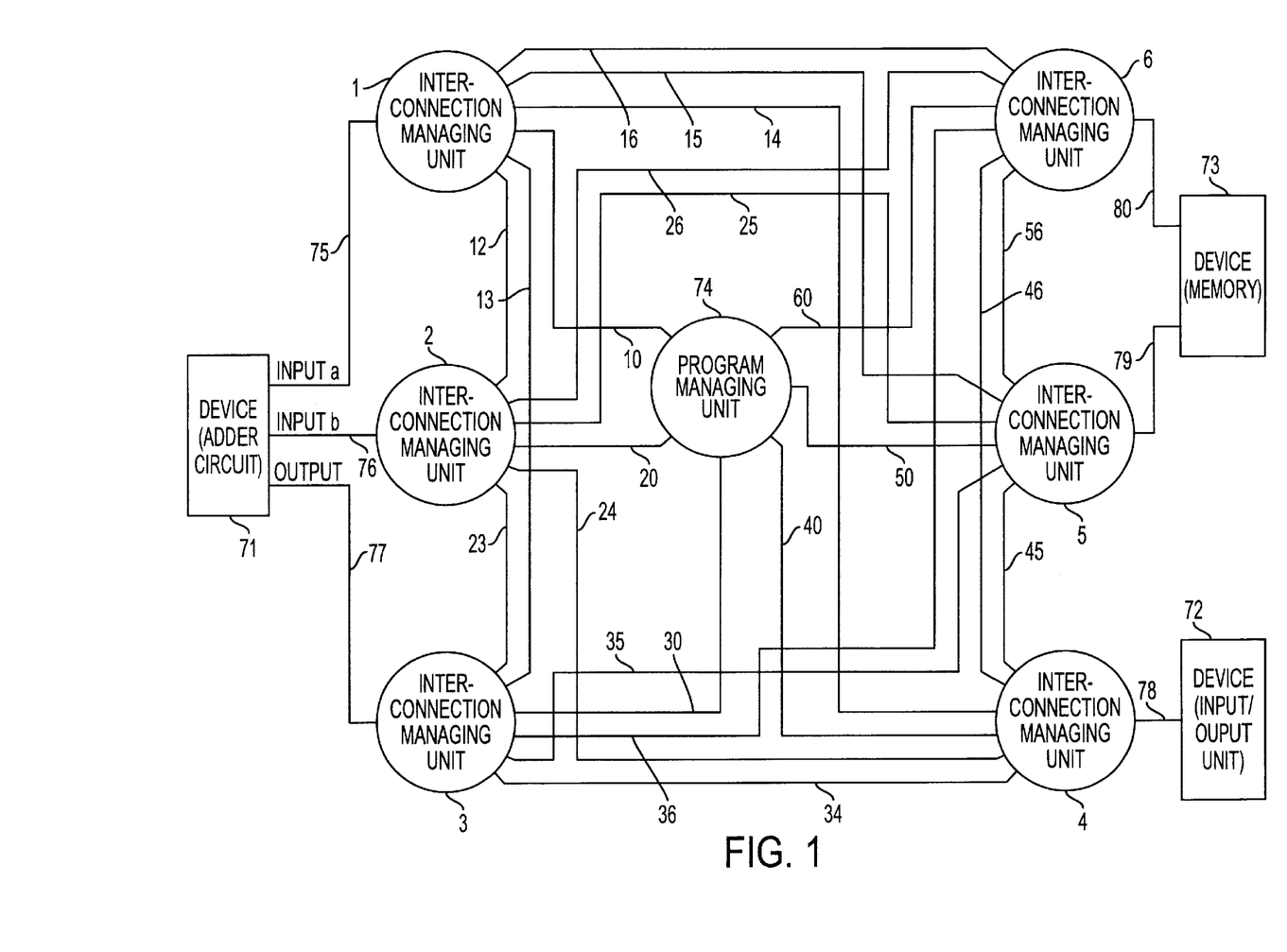
FIG. 1 is a block diagram showing a general arrangement of a data processing system according to an embodiment of the present invention.

FIG. 1 is a block diagram showing a general arrangement of a data processing system according to an embodiment of the present invention. As can be seen in the figure, the data processing system includes a plurality of devices operating as an adder circuit 71, an input/output unit 72 and a memory 73, respectively, wherein interconnection managing units 1, 2, 3, 4, 5 and 6 are connected to input/output ports of the individual devices in one-to-one correspondence relation. Additionally, these interconnection managing units 1, 2, 3, 4, 5 and 6 are connected to one another and at the same time connected collectively to a program managing unit 74.

Figure 5:
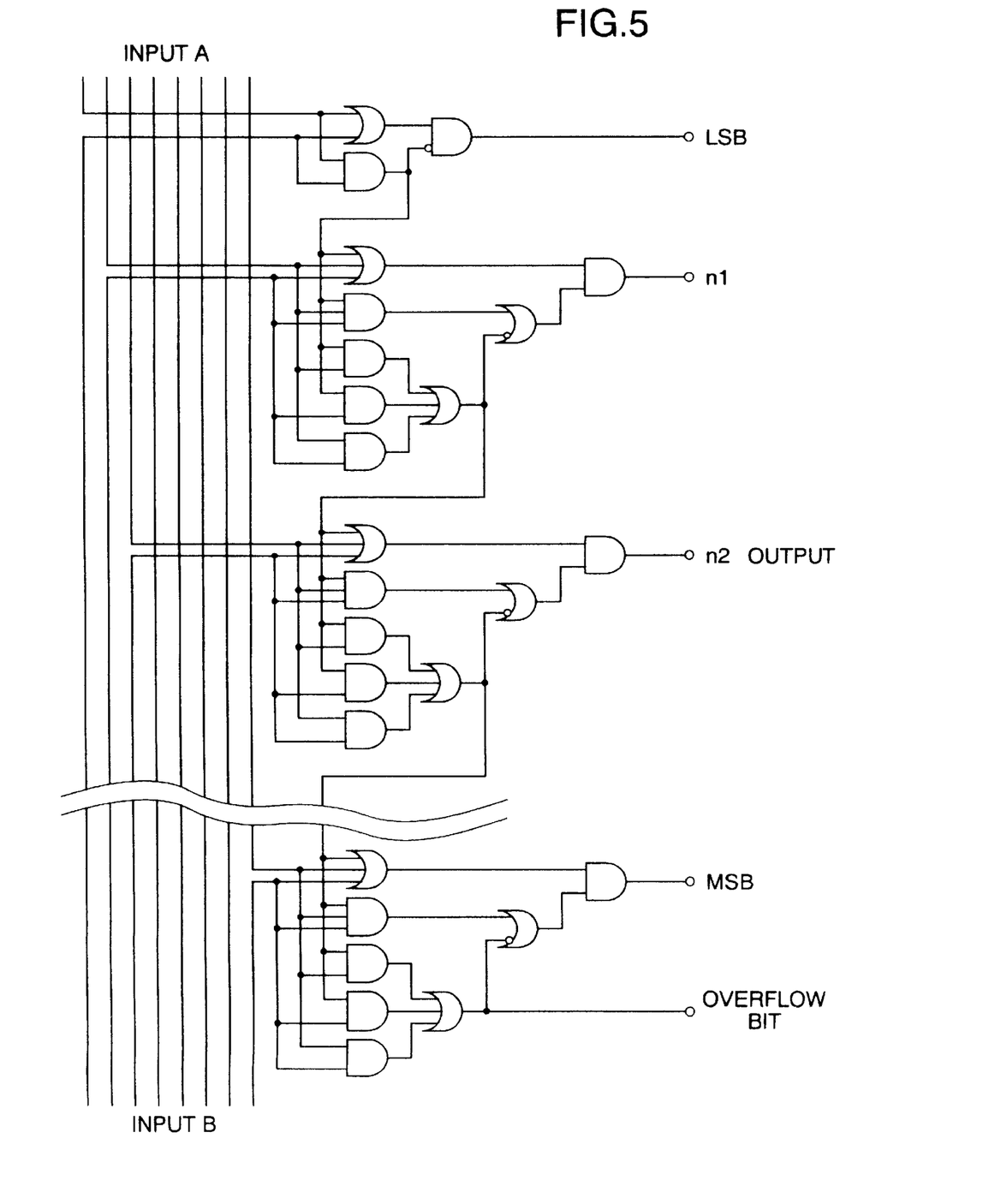
FIG. 5 is a diagram showing in detail a structure of an adder circuit employed in the data processing system shown in FIG. 1.

Referring continuously to FIG. 1, the device 72 is implemented as an input/output unit for performing input/output operations, as described in detail later on, while the device 71 is implemented in the form of an adder circuit having input terminals A and B and an output terminal, detail of which is shown in FIG. 5. Further, the device 73 is realized as a memory which allows data to be written therein and/or read out therefrom in accordance with a program.

Before entering into detailed description of the structure and operation of the data processing system, grammatical composition or syntax as well as description of a program handled by the data processing system shown in FIG. 1 will be explained at first.

By way of example, a program may be described, for example, in the form mentioned below.

1 # m1+s1, n1; m2+s2, n2; ... ; $ q @

In the program mentioned above, descriptor symbols have respective meanings as follows:

1: program ID (identifier) numbers allocated to programs by the program managing unit 74 in the sequence or order in which the programs are generated,

: program ID delimiter symbol in succession to which routing information, condition-related information, data and others are stated, m: descriptor for defining the transfer-destination interconnection managing unit ID number (routing information), s: sub-identifier number which is used in the case where address information is required by the device such as the memory or the like, n: descriptor defining the conditions for data transfer, which descriptor may assume following values:

n=0: indicating unconditional transfer to a succeeding one of the interconnection managing units, n=1~∞: indicating transfer to a succeeding interconnection managing unit only after completion of execution of the programs having the respective ID numbers 1 to ∞, n=?: indicating transfer to a succeeding interconnection managing unit only upon reception of response from a device connected, ;: route/condition delimiter symbol for allowing a plurality of succeeding transfer destinations to be described, $: data descriptor symbol indicating that the following are data, q: descriptor indicating absence or presence of data for allowing data to be fetched in the case of absence and for allowing data to be outputted in the case of presence, @: descriptor symbol indicating the end of program, and ,: punctuation mark for discriminating statements from one to another.

Figure 2:
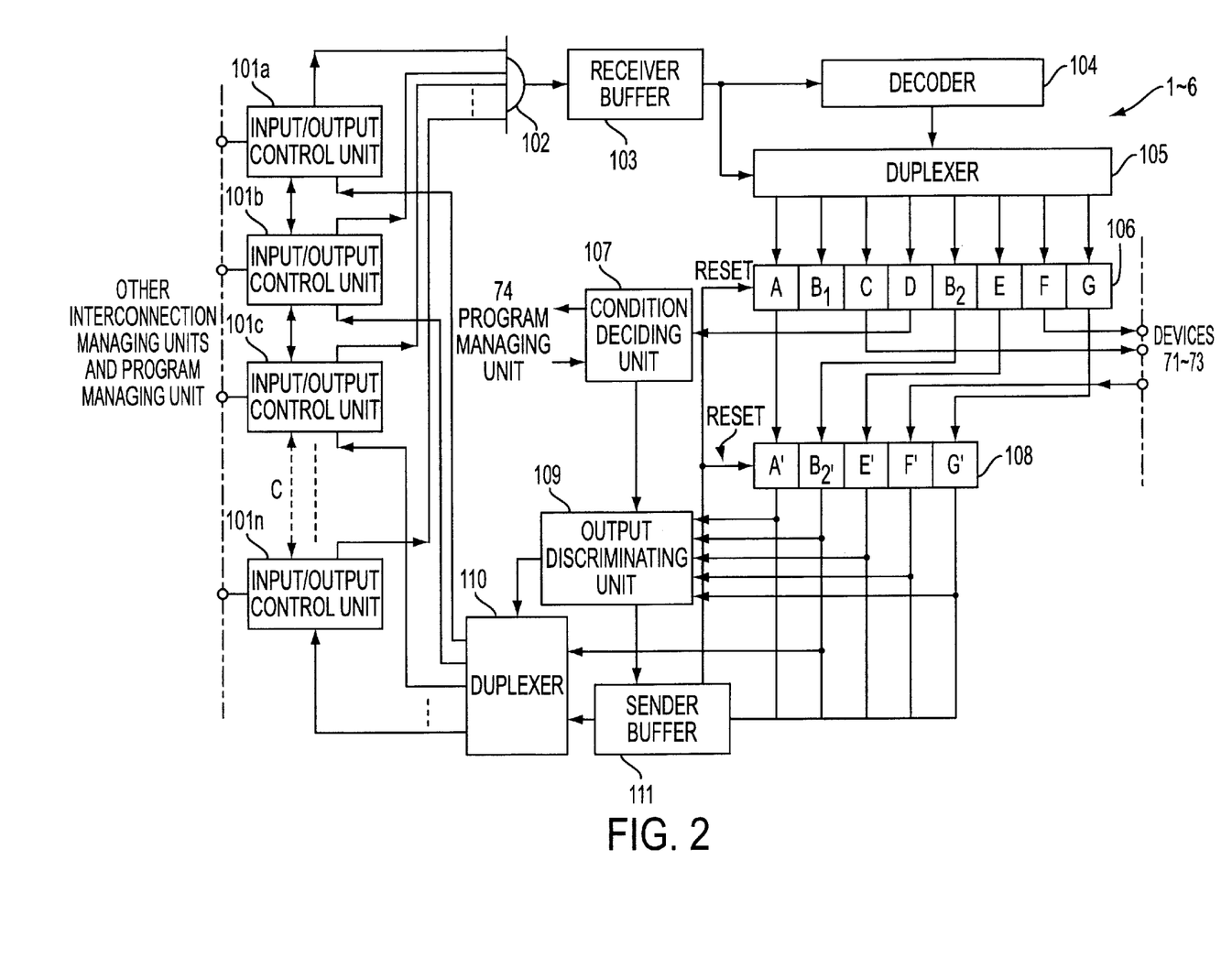
FIG. 2 is a diagram showing in detail a structure of an interconnection managing unit employed in the data processing system shown in FIG. 1.

FIG. 2 is a diagram showing in detail a structure of one of the interconnection managing units 1, 2, 3, 4, 5 and 6 employed in the data processing system shown in FIG. 1.

Referring to the figure, the interconnection managing unit includes input/output control units 101a to 101n which are connected, respectively, to the other interconnection managing units independent of one another, wherein the input/output operation is changed over in response to a signal on a control line C, as will be described in detail later on.

The input/output control units 101a to 101n have respective input terminals coupled to a receiver buffer 103 by way of an AND circuit 102, wherein the output of the receiver buffer 103 is connected to a register 106 by way of a decoder 104 and a duplexer 105.

The above-mentioned register 106 has an area A for storing the program ID number registered by the program managing unit, an area B1 for storing the ID number of the counterpart interconnection managing unit ID to which the interconnection managing unit shown in FIG. 2 is currently connected, a sub-address area C for storing the address of the memory or the like, a condition-related information area D for storing the condition for the transfer or transition, an area B2 for storing the ID number of the interconnection managing unit to be connected in succession, an area E for storing information concerning the data stored in the areas D et seq., an area F for storing data in the intrinsic sense, and a program end symbol area G for storing the descriptor symbol indicating the end of the program.

The data or contents stored in the areas C and F of the register 106 are transferred to the device 71, 72 and/or 73 to be subsequently transferred to a register 108 together with the output data from the device 71, 72 and/or 73.

The register 108 has an area A' for storing the program ID number, an area B2' for storing the succeeding interconnection managing unit which is to be connected in succession, an area E' for storing the information concerning the data stored in the areas D et seq., an area F' for storing the data supplied from the device(s) and an area G' for storing the program end symbol.

Further, the content of the condition-related information area D of the register 106 is transferred to the program managing unit 74 after the relevant program ID number having been discriminatively identified by the condition deciding unit 107.

Furthermore, the output of the condition deciding unit 107 and the content of the register 108 are transferred to an output discriminating unit 109 with the output of the output discriminating unit 109 being supplied to a sender buffer 111 and a duplexer 110, whereas the content of the register 108 is transferred to the interconnection managing unit designated by the information stored in the succeeding interconnection managing unit area B2' of the register 108 through the input/output control unit 101a, ..., 101n by way of the sender buffer 111 and the duplexer 110 or to the program managing unit 74. When the content of the register 108 is transferred to the sender buffer 111, the registers 108 and 106 are reset in preparation for the reception of the succeeding program. Next, the program managing unit 74 will be described in detail by reference to FIG. 3. The program managing unit 74 is connected to the individual interconnection managing units via input/output control units 741a, ..., 741n, respectively, wherein the input signal from the individual interconnection managing unit is inputted to a register 746 via an AND circuit 742, a receiver buffer 743, a decoder 744 and a duplexer 745. The register 746 includes a program ID area A for storing the program ID number, an interconnection managing unit ID number area B for storing the ID number of the interconnection managing unit and a data area C for storing the other data.

Figure 3:
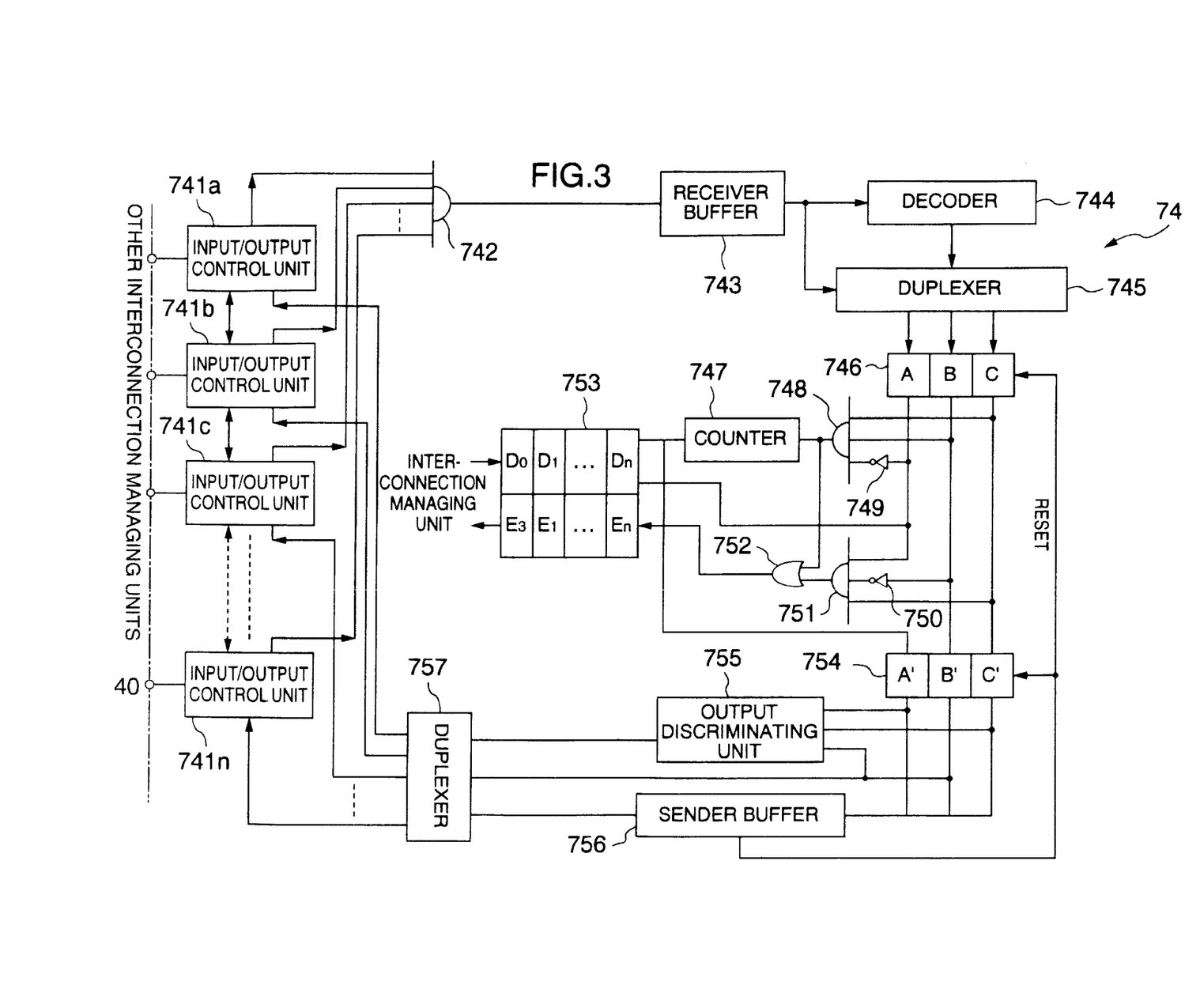
FIG. 3 is a diagram showing in detail a structure of a program managing unit employed in the data processing system shown in FIG. 1.

The values stored in the areas A, B and C of the register 746 are inputted via an inverter 749, an AND circuit 748 and a counter 747 to a program management table 753 provided for managing the program ID numbers as the program ID number value ($D_0, \ldots, D_n$). Furthermore, the values stored in the areas A, B and C of the register 746 are inputted to a NAND circuit 751 via an inverter 750, wherein the output of the NAND circuit 751 is inputted to an end registration column ($E_0, \ldots, E_n$) together with the output of the AND circuit 748 by way of an OR circuit 752. Additionally, the output of the counter 747 and the values B and C stored in the areas B and C of the register 746 are transferred to the areas A', B' and C' of the register 754. On the other hand, the values stored in the areas A', B' and C' of the register 754 are sent out to the interconnection managing unit(s) from an input/output control unit 741a, ..., 741n via an output discriminating unit 755, a sender buffer 756 and a duplexer 757. Further, the registers 746 and 754 are reset in response to the output of the sender buffer 756.

Figure 4:
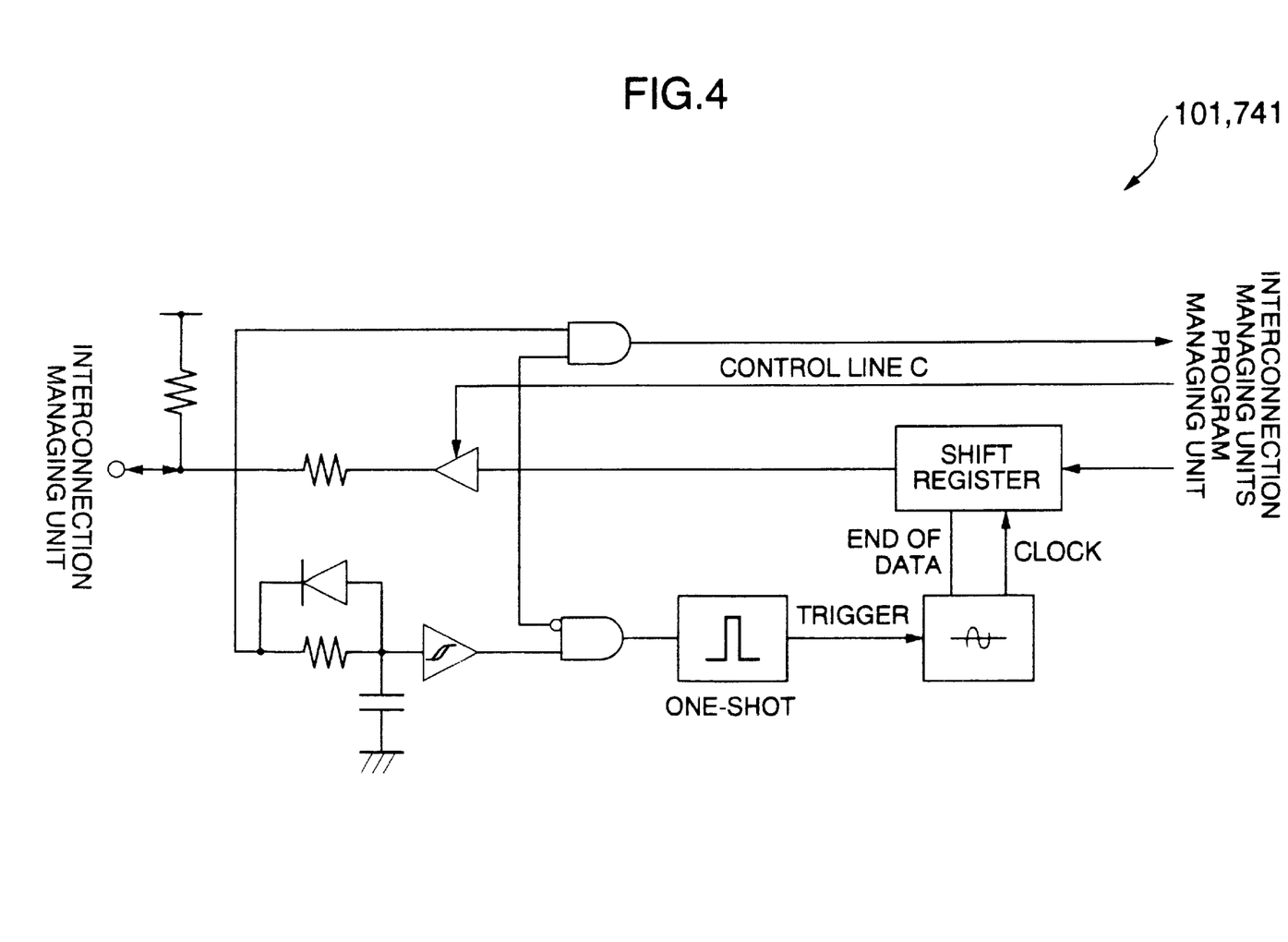
FIG. 4 is a diagram showing in detail a structure of an input/output control unit employed in the data processing system shown in FIG. 1.

The input/output control unit used in association with the interconnection managing unit 1, ..., 6 shown in FIG. 2 and the program managing unit 74 shown in FIG. 3 may be implemented, for example, in such a logic circuit configuration as shown in FIG. 4 so that the input/output signal can be transferred only in one direction between the interconnection managing unit 1, ..., 6 and the program managing unit 74 under the control of a signal on the control line C.

Next, description will be directed to the operation of the data processing system implemented in the configuration elucidated above, assuming that programs mentioned below are executed.

More specifically, it is assumed that programs described with the program grammar and the statements mentioned previously are executed.

$$(1, 0; 6+100, 0; \$ 3 @) \qquad (1)$$

With the above program, data "3", inputted to the interconnection managing unit 1 (No. 1 unit), and then transition is made unconditionally to the interconnection managing unit 6 (No. 6 unit) at which the address "100" of the device connected thereto and the data "3" are loaded, whereupon execution of the program mentioned above comes to an end.

Further, it is assumed that a program mentioned below is executed.

$$(4+200, ?; 2, 0; \$ @) \qquad (2)$$

With the above program, reception of data from the interconnection managing unit 4 (i.e., from the address "200", of the device connected thereto) is waited, and upon reception of the data, transition is made to the interconnection managing unit 2 (No. 2 unit) into which the received data is loaded, whereupon execution of this program is unconditionally ended.

Furthermore, it is assumed that a program mentioned below is executed.

$$(3, 1+2+?; 6+101, 0; 4+200, 0; \$ @) \qquad (3)$$

With the above program, the end of the programs (1) and (2) as well as the result of arithmetic operation are waited for and the data are then received from the interconnection managing unit 3 (No. 3 unit), which is then followed by loading the received data in the interconnection managing unit 6 (No. 6 unit) (at an address "101" of the device connected thereto) with the received data being unconditionally placed in the interconnection managing unit 4 (No. 4) at the address "200", whereupon execution of the program now under consideration is terminated unconditionally.

The content of the processings as involved is to store the data "3" in the memory 73 and added with data inputted through the input/output unit 72 by means of the adder circuit 71, the result of which is written in the memory 73 and transferred concurrently to the input/output unit 72, as in the case of the conventional system described hereinbefore.

When the program (1) given by the description (1, 0; 6+100, 0; $ 3 @) is inputted from the input/output unit 72 constituting one of the so-called devices, this program (1) is stored at the area F' in the register 108 of the interconnection managing unit 4. The program (1, 0; 6+100, 0; $ 3 @) stored as the data at the area F' in the register 108 is also stored in the sender buffer 111. Then, the output discriminating unit 109 determines the storage status of the register 108 (i.e., the state of the register 108 in which only the area F' is occupied) and controls the duplexer 110 so that output thereof is supplied to one of the input/output control units 101a to 101n which is connected to the program managing unit 74.

The input/output control unit connected to the program managing unit 74 checks the state of a signal line 40 connecting the interconnection managing unit 4 and the program managing unit 74 to each other. Provided that the control line C mentioned previously (see FIG. 4) is in the conducting or on-state and that the conducting state of the signal line 40 has continued for a predetermined time, the input/output control unit allows the data mentioned above to be outputted to the program managing unit 74.

The data outputted from the interconnection managing unit 4 is supplied to the duplexer 745 and the decoder 744 by way of one of the input/output control units 741a to 741n (which is connected to the interconnection managing unit 4), the AND circuit 742 and the receiver buffer 743 of the program managing unit 74.

In this conjunction, the decoder 744 serves to identify discriminatively the items "`", ";", "+", "#", "$" and "@" contained in the data, for thereby controlling correspondingly the duplexer 745.

In response to the command issued by the decoder 744, the duplexer 745 distributes the data (1` 0; 6+100, 0;$ 3 @) contained in the receiver buffer 743 to the individual areas of the register 746 in such a manner as follows:

A: vacant

B: 1

C: 0; 6+100, 0; $ 3 @

Through cooperation of the AND circuit 748 and the inverter 749, it is decided that no program ID number is imparted, whereon the counter 747 is incremented (or counted up). The output (program ID number "1") of the counter 747 is stored in the register 754 at the area A' thereof and at the same time supplied to the program management table 753, whereby one of the tables $D_0$ to $D_n$ which corresponds to the program ID number is disabled.

In this conjunction, the content of the register 754 is as follows:

A: 1 #

B: 1

C: 0; 6+100, 0; $ 3 @

The data (1# 1` 0; 6+100, 0;$ 3 @) contained in the register 754 is sent to the sender buffer 756. The output discriminating unit 755 identifies discriminately the content "1#" placed in the register 754 at the area A' thereof to thereby control correspondingly the duplexer 757. More specifically, in response to the command supplied from the output discriminating unit 755, the duplexer 757 outputs the data 1# 1` 0; 6+100, 0;$ 3 @) from the sender buffer 756 to one of the input/output control units 741a to 741n which is connected to the interconnection managing unit 1. This input/output control unit then checks the state of the signal line 10 interconnecting the program managing unit 74 and the interconnection managing unit 1, to output the data to the interconnection managing unit 1 when high level state Hi has continued to exist on the signal line 10 at least for a predetermined time, as mentioned above.

The data outputted from the program managing unit 74 is supplied to the duplexer 105 and the decoder 104 by way of the input/output control unit, the AND circuit 102 and the receiver buffer 103 incorporated in the interconnection managing unit 1. The decoder 104 of the interconnection managing unit 1 identifies discriminatively the data items "`", ";", "+", "#", "$" and "@" to control the duplexer 105. More specifically, the duplexer 105 responds to the command issued from the decoder 104 to thereby distribute the data (1# 1` 0; 6+100, 0;$ 3 @) contained in the receiver buffer 103 to the individual areas of the register 106 as follows:

A: 1 #

B1: 1

C: vacant

D: 0

B2: 6+

E: 100, 0; $

F: 3

G: @

In this conjunction, the data located at the areas A, B2, E and G of the register 106 are sent to the register 108, while the data located at the areas C and F of the register 106 are sent to the adder circuit 71 constituting one of the devices. Further, the data located at the area D of the register 106 is outputted to the condition deciding unit 107.

On the other hand, in the register 108, the data received from the areas or locations A, B2, E and G of the register 106 and the data received from the device or adder circuit 71 are stored in such a manner as mentioned below:

A': 1 #

B2': 6+

E': 100, 0; $

F': 3

G': @

The data given by (1# 6+100, 0; $ 3 @) and stored in the register 108 in this way are sent to the sender buffer 111. Then, the condition deciding unit 107 identifies or determines the content "0" (indicating "unconditional") in the area D of the register 106 to thereby enable the output discriminating unit 109, which then controls the duplexer 110 on the basis of the contents of the register 108. On the other hand, the duplexer 110 responds to the output of the output discriminating unit 109 to thereby send the data (1# 6+100, 0; $ 3 @) from the sender buffer 111 to the input/output control unit connected to the interconnection managing unit 6. The input/output control unit checks the state of a signal line 16 to output the data to the interconnection managing unit 6 at a time point up to which the high level Hi has continued to exist on the signal line 16 for a predetermined time period.

The data outputted from the interconnection managing unit 1 is supplied to the duplexer 105 and the decoder 104 of the interconnection managing unit 6 by way of the associated one of the input/output control units 101a to 101n of the interconnection managing unit 6, the AND circuit 102 and the receiver buffer 103. In that case, the decoder 104 identifies discriminatively the data items "'", ";", "+", "#", "$" and "@", to thereby control the duplexer 105 correspondingly. More specifically, the duplexer 105 responds to the command issued from the decoder 104 to thereby distribute the data (1# 6+100, 0; $ 3 @) contained in the receiver buffer 103 to the individual areas of the register 106 as follows:

A: 1 #

B1: 6+

C: 100

D: 0

B2: vacant

E: $

F: 3

G: @

In this conjunction, the data located at the areas A, B2, E and G of the register 106 are sent to the register 108, while the data located at the areas C and F of the register 106 are sent to the address "100" of the memory 73 constituting one of the so-called devices. Further, the data located at the area D of the register 106 is outputted to the condition deciding unit 107.

On the other hand, in the register 108, the data received from the register 106 and the device or memory 73 are stored in such a manner as mentioned below:

A': 1 #

B2': vacant

E': $

F': 3

G': @

The data (1 # $ 3 @) stored in the register 108 in this way are sent to the sender buffer 111. On the other hand, the condition deciding unit 107 identifies or determines the content "0" (unconditional) in the area D of the register 106 to thereby enable the output discriminating unit 109, which then controls the duplexer 110 on the basis of the contents of the register 108. On the other hand, the duplexer 110 responds to the output of the output discriminating unit 109 (indicating that the area B2' is vacant) by sending the data (1 # $ 3 @) from the sender buffer 111 to the input/output control unit connected to the program managing unit 74. The input/output control unit checks the state of a signal line 60 to output the data to the program managing unit 74 in the case where the high level Hi has continued to exist on the signal line 60 for a predetermined time period.

The data outputted from the interconnection managing unit 6 is supplied to the duplexer 745 and the decoder 744 by way of one of the input/output control units 741a to 741n incorporated in the program managing unit 74, the AND circuit 742 and the receiver buffer 743. The decoder 744 identifies discriminatively the data items "'", ";", "+", "#", "$" and "@" to thereby control the duplexer 745. More specifically, the duplexer 745 responds to the command issued from the decoder 744 to distribute the data (1# $ 3 @) contained in the receiver buffer 743 to the individual areas of the register 746 as follows:

A: 1 #

B: vacant

C: $ 3 @

When it is decided through cooperation of the inverter 750, the NAND circuit 751 and the OR circuit 752, that the program is terminated (i.e., when B is vacant), one of the tables $D_0$ to $D_n$ which corresponds to the program ID number (A) is enabled.

When the program (2)(4+200, ?; 2, 0; $ @) is inputted from the input/output unit 72 constituting one of the devices, this program (2) is stored at the area F' of the register 108 incorporated in the interconnection managing unit 4. The data (4+200, ?; 2, 0; $ @) stored at the area F' in the register 108 is loaded in the sender buffer 111. Then, the output discriminating unit 109 determines the storage status of the register 108 (i.e., the state of the register 108 in which only the area F' is occupied) to control the duplexer 110 so that the output thereof is supplied to one of the input/output control units 741a to 741n incorporated in the program managing unit 74. The input/output control unit of the interconnection managing unit 4 checks the state of the signal line 40 to output the program as the data to the program managing unit 74 at a time point to which the high level Hi has continued to exist on the signal line 16 for a predetermined time period.

The data outputted from the interconnection managing unit 4 is supplied to the duplexer 745 and the decoder 744 by way of one of the input/output control units 741a to 741n, the AND circuit 742 and the receiver buffer 743. In that case, the decoder 744 identifies discriminatively the items "'", ";", "+", "#", "$" and "@" contained in the data for controlling correspondingly the duplexer 745. In response to the command issued by the decoder 744, the duplexer 745 distributes the data (4+200ˋ ?; 2ˋ 0; $ @) contained in the receiver buffer 743 to individual areas of the register 746 in such a manner as follows:

A: vacant

B: 4

C: +200ˋ ?; 2ˋ 0; $ @

Next, through cooperation of the decoder 744 and the AND circuit 748, it is decided that no program ID number is imparted, whereon the counter 747 is incremented (or counted up). The output of the counter 747 is stored in the register 754 at the area A' thereof and at the same time supplied to the program management table 753, whereby one of the tables $D_0$ to $D_n$ which corresponds to the program ID number is disabled. Thus, the content of the register 754 is as follows:

A': 2 #

B': 4

C': +200ˋ ?; 2ˋ 0; $ @

Further, the data (2# 4+200ˋ ?; 2ˋ 0; $ @) contained in the register 754 is sent to the sender buffer 756. The output discriminating unit 755 identifies discriminately the content placed in the register 754 at the area A' to thereby control correspondingly the duplexer 757. More specifically, in response to the command supplied from the output discriminating unit 755, the duplexer 757 allows the data (2# 4+200ˋ ?; 2ˋ 0; $ @) to be outputted from the sender buffer 756 to one of the input/output control units 741a to 741n which is connected to the interconnection managing unit 4. The input/output control unit checks the state of the signal line 10 to thereby output the data to the interconnection managing unit 4 when high level state Hi has continued to exist on the signal line 10 at least for a predetermined time.

The data outputted from the program managing unit 74 is supplied to the duplexer 105 and the decoder 104 of the interconnection managing unit 4 by way of one of the input/output control units 101a to 101n, the AND circuit 102 and the receiver buffer 103. The decoder 104 identifies discriminatively the data items "ˋ", ";", "+", "#", "$" and "@" to thereby control the duplexer 105. To say in another way, the duplexer 105 responds to the command issued from the decoder 104 to distribute the data (2# 4+200ˋ ?; 2ˋ 0; $ @) contained in the receiver buffer 103 to the individual areas of the register 106 of the interconnection managing unit 4 as follows:

A: 2 #

B1: 4+

C: 200

D: ?

B2: 2

E: 0; $

F: vacant

G: @

In that case, the data located at the items A, B2, E and G of the register 106 are sent to the register 108, while the data located in the area C (at the address "200") and F (vacant) are sent to the input/output unit 72 serving as one of the devices. Further, the data located in the area D of the register 106 is transferred to the condition deciding unit 107.

On the other hand, in the register 108, the data received from the register 106 and the device or input/output unit 72 are stored in such a manner as mentioned below:

A': 2 #

B2': 2

E': 0; $

F': X (data from the device 72)

G': @

The data (2# 2, 0; $ X @) stored in the register 108 in this way are sent to the sender buffer 111. Then, the condition deciding unit 107 identifies or determines the content in the area or item D of the register 106 and waits for storage of the data in the area F' of the register 108 for thereby enabling the output discriminating unit 109. Then, the output discriminating unit 109 controls the duplexer 110 on the basis of the contents of the register 108 to send the data (2# 2ˋ 0; $ X @) from the sender buffer 111 to the input/output control unit 101a, . . . , or 101n which is connected to the interconnection managing unit 2. The input/output control unit 101a, . . . , or 101n checks the state of a signal line 24 to output the relevant data to the interconnection managing unit 2 at a time point, provided that the high level Hi has continued to exist on the signal line 24 for a predetermined time period.

The data outputted from the interconnection managing unit 4 is supplied to the duplexer 105 and the decoder 104 by way of one of the input/output control units 101a to 101n of the interconnection managing unit 2, the AND circuit 102 and the receiver buffer 103. The decoder 104 identifies discriminatively the data items "ˋ", ";", "+", "#", "$" and "@" to thereby control the duplexer 105. More specifically, the duplexer 105 responds to the command issued from the decoder 104 to distribute the data (2# 2, 0; $ X @) contained in the receiver buffer 103 to the individual areas of the register 106 as follows:

A: 2 #

B1: 2

C: vacant

D: 0

B2: vacant

E: $

F: X

G: @

In this conjunction, the data located at the areas A, B2, E and G of the register 106 of the input/output control unit 2 are sent to the register 108, while the data located at the areas C and F of the register 106 are sent to the adder circuit 71 constituting one of the so-called devices. Further, the data located at the area D of the register 106 is outputted to the condition deciding unit 107. On the other hand, in the register 108, the data received from the register 106 and the device or adder circuit 71 are stored in such a manner as mentioned below:

A': 2 #

B2': vacant

E': $

F': X

G': @

The data (2# $ X @) stored in the register 108 in this way are sent to the sender buffer 111. On the other hand, the condition deciding unit 107 identifies or determines the content "0" (unconditional) in the area D of the register 106 to thereby enable the output discriminating unit 109, which then controls the duplexer 110 on the basis of the contents of the register 108 (indicating the area B2' is vacant) to thereby allow the data (2# $ X @) to be sent from the sender buffer 111 to the input/output control unit 101a, . . . , or 101n which is connected to the program managing unit 74. The input/output control unit checks the state of the signal line 20 to output the data to the program managing unit 74 when the high level Hi has continued to exist on the signal line 20 for a predetermined time period.

The data outputted from the interconnection managing unit 2 is supplied to the duplexer 745 and the decoder 744 of the program managing unit 74 by way of the associated one of the input/output control units 741a to 741n, the AND circuit 742 and the receiver buffer 743. The decoder 744 identifies discriminatively the data items "ˋ", ";", "+", "#", "$" and "@" to thereby control the duplexer 745 correspondingly. In other words, the duplexer 745 responds to the command issued from the decoder 744 to distribute the data (2# $ X @) contained in the receiver buffer 743 to the individual areas of the register 746 as follows:

A: 2 #

B: vacant

C: $ X @

It is then decided through cooperation of the inverter 750, the NAND circuit 751 and the OR circuit 752 that the execution of the program has been completed (i.e., B is vacant), whereon one of the tables ($D_0$ to $D_n$) which corresponds to the program ID number (A="2") is enabled.

When the program (3) is inputted from the input/output unit 72 constituting one of the so-called devices, this program (3) is stored in the area F' of the register 108. The program (3, 1+2+?; 6+101, 0; 4+200, 0; $ @) stored in the area F' of the register 108 as the data is loaded in the sender buffer 111.

Then, the output discriminating unit 109 determines the store status of the register 108 (i.e., the state of the register 108 in which only the area F' is occupied) to control the duplexer 110 so that the output thereof is supplied to one of the input/output control units 101a to 101n connected to the program managing unit 74. The input/output control unit 101a, . . . , or 101n which is checks the state of the signal line 40 to allow the data to be outputted to the program managing unit 74, provided that the high level Hi has continued to exist on the signal line 16 for a predetermined time period.

Thus, the data outputted from the interconnection managing unit 4 is supplied to the duplexer 745 and the decoder 744 of the program managing unit 74 by way of one of the input/output control units 741a to 741n, the AND circuit 742 and the receiver buffer 743.

In that case, the decoder 744 serves to identify discriminatively the items "٠", ";", "+", "#", "$" and "@" contained in the data for controlling correspondingly the duplexer 745. In response to the command issued by the decoder 744, the duplexer 745 distributes the data (3, 1+2+?; 6+101, 0; 4+200, 0; $ @) contained in the receiver buffer 743 to the individual areas of the register 746 in such a manner as follows:

A: vacant

B: 3

C: 1+2+?; 6+101, 0; 4+200, 0; $ @

Next, decision is made through cooperation of the decoder 744 and the AND circuit 748, that no program ID number is imparted, whereon the counter 747 is incremented. The output of the counter 747 is stored in the register 754 at the area A' thereof and at the same time supplied to the program management table 753, whereby one of the tables $D_0$ to $D_n$ which corresponds to the program ID number is disabled. Thus, the content of the register 754 is as follows:

A': 3 #

B': 3

C': 1+2+?; 6+101, 0; 4+200, 0; $ @

Further, the data (3# 3, 1+2+?; 6+101, 0; 4+200, 0; $ @) contained in the register 754 is sent to the sender buffer 756.

The output discriminating unit 755 identifies discriminately the content (3#) placed in the register 754 at the area A' to thereby control correspondingly the duplexer 757. More specifically, in response to the command supplied from the output discriminating unit 755, the duplexer 757 outputs the data (3# 3, 1+2+?; 6+101, 0; 4+200, 0; $ @) from the sender buffer 756 to the input/output control unit 741a, . . . , or 741n which is connected to the interconnection managing unit 3.

The input/output control unit checks the state of a signal line 30 to thereby output the data to the interconnection managing unit 3 when high level state Hi has continued to exist on the signal line 30 at least for a predetermined time.

The data outputted from the program managing unit 74 is supplied to the duplexer 105 and the decoder 104 of the interconnection managing unit 3 by way of one of the input/output control units 101a to 101n, the AND circuit 102 and the receiver buffer 103.

The decoder 104 of the interconnection managing unit 3 identifies discriminatively the data items "٠", ";", "+", "#", "$" and "@" to thereby control the duplexer 105 correspondingly. More specifically, the duplexer 105 responds to the command issued from the decoder 104 of the interconnection managing unit 3 to distribute the data (3# 3, 1+2+?; 6+101, 0; 4+200, 0; $ @) contained in the receiver buffer 103 to the individual areas of the register 106 of the interconnection managing unit 3 as follows:

A: 3 #

B1: 3

C: vacant

D: 1+2+?

B2: 6+

E: 101, 0; 4+200, 0; $

F: vacant

G: @

The data located in the areas A, B2, E and G of the register 106 are sent to the register 108, while the data located at the area C (vacant) and F (vacant) are sent to the adder circuit 71 constituting one of the devices. Further, the data located at the area D of the register 106 is transferred to the condition deciding unit 107. On the other hand, in the register 108, the data received from the register 106 and the device or adder circuit 71 are stored in such a manner as mentioned below:

A': 3 #

B2': 6+

E': 101, 0; 4+200, 0; $

F': y (data from the device 71)

G': @

The data (3# 6+101, 0; 4+200, 0; $ y @) stored in the register 108 in this way are sent to the sender buffer 111.

Then, the condition deciding unit 107 identifies or determines the content of the area D of the register 106 to output the program ID number 1 to the program managing unit 74 for thereby receiving the data of the program management table 753 corresponding to the program ID number 1 while outputting the program ID number 2 to the program managing unit 74 to receive the data corresponding to the program ID number 2 managed by the program management table 753. Subsequently, the condition deciding unit 107 waits for storage of data in the area F' of the register 108 for thereby enabling the operation of the output discriminating unit 109 of the interconnection managing unit 3.

The output discriminating unit 109 controls the duplexer 110 on the basis of the contents of the register 108 to allow the data (3# 6+101, 0; 4+200, 0; $ y @) to be sent from the sender buffer 111 to the input/output control unit 101a, . . . , or 101n of the interconnection managing unit 6. The input/output control unit 101a, . . . , or 101n checks the state of the signal line 24 to output the relevant data to the interconnection managing unit 6, provided that the high level Hi has continued to exist on the signal line 24 for a predetermined time period.

The data outputted from the interconnection managing unit 3 is supplied to the duplexer 105 and the decoder 104 of the interconnection managing unit 6 by way of one of the input/output control units 101a to 101n, the AND circuit 102 and the receiver buffer 103. The decoder 104 identifies discriminatively the data items "`", ";", "+", "#", "$" and "@" to thereby control the duplexer 105. More specifically, the duplexer 105 responds to the command issued from the decoder 104 to distribute the data (3# 6+101, 0; 4+200, 0; $ y @) contained in the receiver buffer 103 to the individual areas of the register 106 as follows:

A: 3 #
B1: 6+
C: 101
D: 0
B2: 4+
E: 200, 0; $
F: y
G: @

The data located at the areas A, B2, E and G of the register 106 of the input/output control unit 6 are sent to the register 108, while the data located at the areas C (at the address 101) and the data "y" in the area F of the register 106 are sent to the memory 73 constituting one of the devices. Further, the data located at the area D of the register 106 is outputted to the condition deciding unit 107.

In the register 108, the data received from the register 106 and the device or memory 73 are stored in such a manner as follows:

A': 3 #
B2': 4+
E': 200, 0; $
F': y
G': @

The data (3# 4+200, 0; $ y @) stored in the register 108 in this way are sent to the sender buffer 111. On the other hand, the condition deciding unit 107 identifies or determines the content "0" (unconditional) in the area D of the register 106 to thereby enable the output discriminating unit 109, which then controls the duplexer 110 on the basis of the contents of the register 108 of the interconnection managing unit 6 to thereby allow the data (3# 4+200, 0; $ y @) to be sent from the sender buffer 111 to the input/output control unit 101a, . . . , or 10n of the interconnection managing unit 4. The input/output control unit 101a, . . . , or 101n checks the state of the signal line 46 to output the data to the interconnection managing unit 4 when the high level Hi has continued to exist on the signal line 46 for a predetermined time period.

The data outputted from the interconnection managing unit 6 is supplied to the duplexer 105 and the decoder 104 of the interconnection managing unit 4 by way of one of the input/output control units 101a to 101n, the AND circuit 102 and the receiver buffer 103. The decoder 104 identifies discriminatively the data items "`", ";", "+", "#", "$" and "@" to thereby control the duplexer 105. More specifically, the duplexer 105 responds to the command issued from the decoder 104 to distribute the data (3# 4+200, 0; $ y @) contained in the receiver buffer 103 to the individual areas of the register 106 as follows:

A: 3
B1: 4+
C: 200
D: 0
B2: vacant
E: $
F: y
G: @

The data located at the areas A, B2, E and G of the register 106 are sent to the register 108, while the data located at the areas C (at the address 200) and the data "y" in the area F of the register 106 are sent to the input/output unit 72 serving as one of the devices. Further, the data located at the area D of the register 106 is outputted to the condition deciding unit 107. On the other hand, in the register 108, the data are stored in such a manner as mentioned below:

A': 3 #
B2': vacant
E': $
F': y

The data (3# $ y @) stored in the register 108 in this way are sent to the sender buffer 111. On the other hand, the condition deciding unit 107 identifies or determines the content "0" (unconditional) in the item D of the register 106 to thereby enable the output discriminating unit 109, which then controls the duplexer 110 on the basis of the contents of the register 108 to thereby allow the data (3# $ y @) to be sent from the sender buffer 111 to the input/output control unit 101a, . . . , or 101n which is connected to the program managing unit 74. The input/output control unit 101a, . . . , or 101n checks the state of the signal line 46 to output the data to the program managing unit 74 so long as the high level Hi has continued to exist on the signal line 46 for a predetermined time period.

The data outputted from the interconnection managing unit 4 is supplied to the duplexer 745 and the decoder 744 of the program managing unit 74 by way of one of the input/output control unit 741a, . . . , or 741n, the AND circuit 742 and the receiver buffer 743. The decoder 744 identifies discriminatively the data items "`", ";", "+", "#", "$" and "@" to thereby control the duplexer 745. Namely, the duplexer 745 responds to the command issued from the decoder 744 to distribute the data (3# $ y @) contained in the receiver buffer 743 to the individual areas of the register 746 as follows:

A: 3 #
B: vacant
C: $ y @

Through cooperation of the inverter 750, the NAND circuit 751 and the OR circuit 752, it is decided that the program is completed (i.e., the area B is vacant), whereupon one of the tables $D_0$ to $D_n$ which corresponds to the program ID number (A) is enabled.

In the foregoing, description has been made of the operation of the data processing system in accordance with a series of flows of the programs (1), (2) and (3) mentioned previously. At this juncture, it should be added that after the processing for imparting the program ID numbers to the programs inputted from the device 72 (input/output unit) has been performed, the programs can be transferred to the respective destinations in parallel in accordance with the routing information contained in the programs so long as the destinations are vacant.

In the foregoing description of the data processing system, it has been assumed that a series of processings are executed in accordance with the three programs. They are: program (1) (1, 0; 6+100, 0; $ 3 @) according to which the data "3" is inputted to the interconnection managing unit 1, and then transition is made unconditionally to the interconnection managing unit 6 at which the address "100" of the device connected thereto and the data "3" are loaded, whereupon execution of the program (1) is terminated unconditionally, program (2) (4+200, ?; 2, 0; $ @) according to which reception of data from the interconnection managing unit 4 (i.e., from the address "200" of the device connected thereto) is awaited, and upon reception of the data, transition is made to the interconnection managing unit 2 into which the received data is loaded, whereupon execution of the program (2) is unconditionally ended, and program (3) (3, 1+2+?; 6+101, 0; 4+200, 0; $ @) according to which the end execution of the programs (1) and (2) as well as the result of the relevant arithmetic operation is waited for and when data are received from the interconnection managing unit 3, the received data is loaded in the interconnection managing unit 6 (at the address "101" of the device connected thereto) with the received data being unconditionally placed in the interconnection managing unit 4 (at the address "200"), whereupon execution of the program (3) is terminated unconditionally.

In the course of execution of the processings mentioned above, once the management of the condition-related information has been completed by imparting the program ID numbers to the programs by means of the program managing unit 74, the processings involved in transferring the programs (1), (2) and (3) to the interconnection managing unit 3 to wait for completion of execution of the programs (1) and (2) can be carried out concurrently because no conflict can occur in respect to the route for use, the interconnection managing unit, the so-called devices and others.

As is apparent from the foregoing, with the data processing system according to the invention, a plurality of processings can concurrently be carried with high speed owing to the data processings based on the program which contains the routing information indicating the order of transfers or transitions from one to another interconnection managing unit and the condition-related information indicating the conditions for allowing the transitions among the interconnection units.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described on the assumption that three programs are handled and that six interconnection managing units are employed, the invention is never limited to any particular numbers.

Accordingly, all suitable modifications and equivalents may be resorted to, falling within the spirit and scope of the invention.

I claim:

1. A data processing system for processing a program including at least a descriptor defining the conditions for data transfer, a route/condition delimiter symbol for allowing a plurality of succeeding transfer destinations and data, said system comprising:

a plurality of devices for processing data;

a plurality of interconnection managing means interconnected to one another by direct exclusive wiring and each provided at least in one-to-one correspondence in association with each of said devices for allowing the associated devices to execute processings in accordance with the program by providing extracted data to be processed from the program and receiving processed data from said device to be included in said program and sending said program to the other interconnected interconnection managing means; and program managing means connected to all of said interconnection managing means by direct exclusive wiring for managing execution of said program by allocating a program number in a sequence order according to which said program is to be executed in each of said interconnection managing means, said program comprising routing information indicating an order in which said program is transferred among said interconnection managing means until said program reaches at least the interconnection managing means to be selected and condition-related information indicating a transfer condition for enabling the transfer of said program among said interconnection managing means;

said interconnection managing means transferring the relevant program to the relevant interconnection managing means as selected in accordance with said routing information and said condition-related information and wherein said selected interconnection managing means allows the program transferred thereto to be executed on the device connected in association with said selected interconnection managing means in accordance with the transferred program.

2. A data processing system according to claim 1, wherein said program further comprises data to be processed, and said data is processed by the device connected to said selected interconnection managing means.

3. In a data processing system which includes a plurality of devices for processing data, a plurality of interconnection managing means interconnected to one another and each provided at least in one-to-one correspondence in association with each of said devices for allowing the associated devices to execute processings in accordance with a program as inputted and sending said program to the other interconnected interconnection managing means, and program managing means connected to all of said interconnection managing means for managing execution of the said program in each of said interconnection managing means, a method of describing a program, comprising the step of:
describing said program so that said program contains at least data to be processed, routing information indicating an order in which said program is transferred among said interconnection managing means and condition-related information indicating transfer conditions allowing said program to be transferred among said interconnection managing means.

4. A data processing system, comprising:

a plurality of devices for processing data;

a plurality of interconnection managing means interconnected to one another and each provided at least in one-to-one correspondence in association with each of said devices for allowing the associated device to execute processings in accordance with a program as inputted and sending said program to the other interconnected interconnection managing means, said program including routing information indicating an order in which said program is transferred among said interconnection managing means until said program reaches at least an interconnection managing means to be selected and condition-related information indicating a transfer condition for enabling the transfer of said program among said interconnection managing means, said interconnection managing means transferring the relevant program to the relevant interconnection managing means as selected in accordance with said routing information and said condition-related information in said program, wherein said selected interconnection managing means allows the program transferred thereto to be executed on the device connected in association with said selected interconnection managing means in accordance with the transferred program; and program managing means connected to all of said interconnection managing means for managing execution of said program in each of said interconnection managing means.

5. A data processing system according to claim 4, said program further comprising data to be processed, wherein said data is processed by the device connected to said selected interconnection managing means.

\* \* \* \* \*

UNITED STATES PATENT AND TRADEMARK OFFICE
CERTIFICATE OF CORRECTION

PATENT NO.: 6,006,250
DATED    : December 21, 1999
INVENTOR(S): Naoki Suhara

It is certified that error appears in the above-identified patent and that said Letters Patent is hereby corrected as shown below:

Column 14, between lines 14 and 15, insert --G' : @--.

Signed and Sealed this

Twenty-fourth Day of October, 2000

Attest:

Q. TODD DICKINSON

Attesting Officer

Director of Patents and Trademarks